US005344249A

United States Patent [19]

Seifert

[11] Patent Number: 5,344,249

[45] Date of Patent: Sep. 6, 1994

[54] DOOR ROD LOCK LINK

[75] Inventor: Arthur P. Seifert, Englewood, Ohio

[73] Assignee: Master Industries, Inc., Ansonia, Ohio

[21] Appl. No.: 992,572

[22] Filed: Dec. 18, 1992

Related U.S. Application Data

[63] Continuation-in-part of Ser. No. 898,558, Jun. 15, 1992, abandoned.

[51] Int. Cl.[5] .............................................. F16B 27/00

[52] U.S. Cl. ........................................ 403/3; 403/286; 403/303; 403/341

[58] Field of Search ............... 74/586; 403/3, 11, 341, 403/286, 305, 300, 303, 309, 313, 302

[56] References Cited

U.S. PATENT DOCUMENTS

| | | | |
|---|---|---|---|
| 3,305,254 | 2/1967 | Hopkins . | |
| 4,852,425 | 8/1989 | Stocker . | |
| 5,035,528 | 7/1991 | Thau . | |
| 5,094,578 | 3/1992 | Light et al. | 411/104 |

*Primary Examiner*—Randolph A. Reese
*Assistant Examiner*—Anthony Knight
*Attorney, Agent, or Firm*—Barnes, Kisselle, Raisch, Choate, Whittemore & Hulbert

[57] ABSTRACT

A link for facilitating the joining of two rods while compensating for manufacturing irregularities in rod length and other manufacturing and assembly tolerances to produce a rigid assembly of proper length including a clip base for receiving an end of each rod and a sleeve to lock the assembly. The clip has an opening on one end for receiving a first rod and a threaded opening and longitudinal recess at the opposite end for receiving a threaded end of the second rod. The second rod may be pushed transversely to its axis into the recess and opening at any point along the opening to rigidly link the two rods together while compensating for manufacturing and assembly tolerance variations. The sleeve is telescopingly locked over the recess to secure the second rod in the clip. In a second link embodiment, the sleeve, when received on the clip in the closed position and covering the recess, may be released and slidably moved over the clip to an open position permitting the second rod to be removed from the clip and reinserted along the recess into the threaded opening to adjust the total length of the assembly.

26 Claims, 3 Drawing Sheets

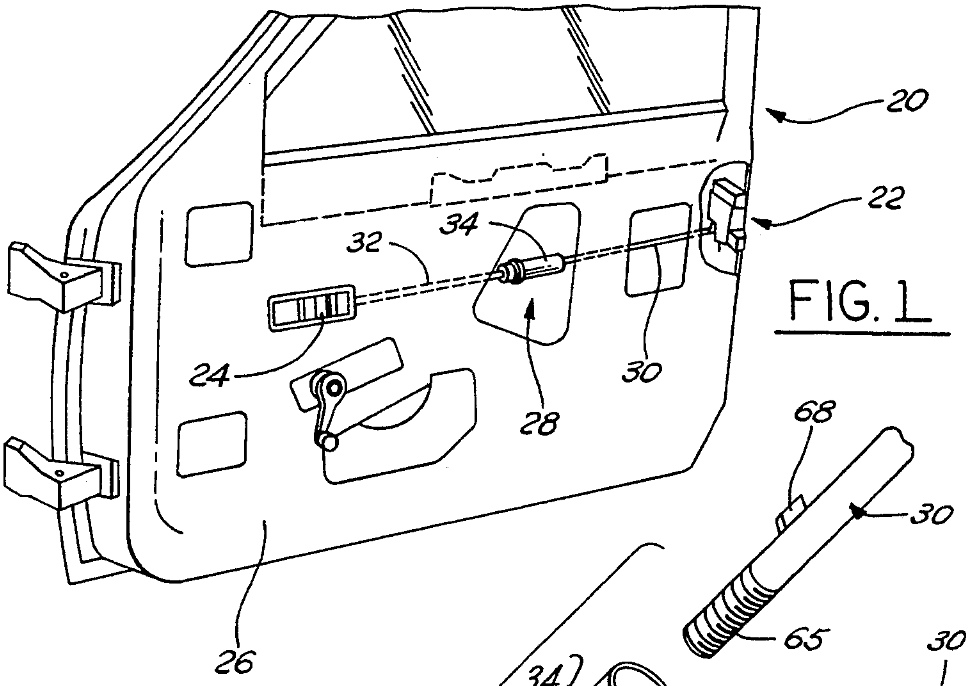
FIG. 1
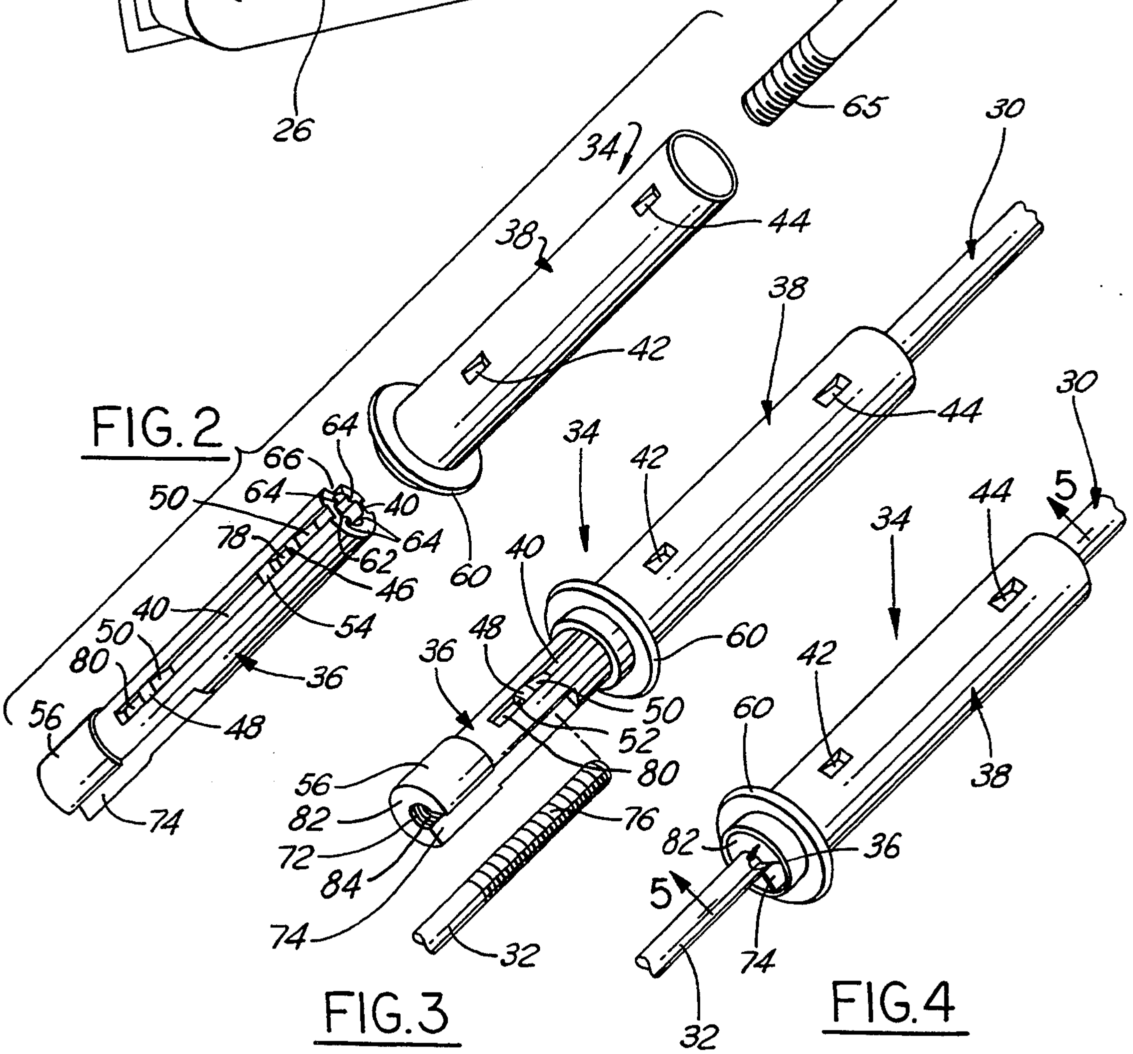
FIG. 2
FIG. 3
FIG. 4

DOOR ROD LOCK LINK

REFERENCE TO RELATED APPLICATION

This application is a continuation-in-part of application Ser. No. 898,558 filed Jun. 15, 1992 now abandoned.

FIELD OF THE INVENTION

Link used in manufacturing assembly operations to effectively join two rods while compensating for any manufacturing non-uniformities in length of the two rods.

BACKGROUND AND FEATURES OF THE INVENTION

Frequently, problems in maintaining the tolerance of a manufactured part result in an assembly incorporating the part having undesirable operating characteristics. For example, manufactured rods that are too long, short, wide or narrow, can produce poorly operating assemblies of reduced quality and reliability. Connector rods of excessive length frequently result in an assembly which feels loose or possesses a great deal of play. Rods which are too short are prone to tight or sticky operation and when moved may not transmit the necessary displacement to a connected part being moved. Finally, prospective purchasers examining a product with such substandard subassemblies can be negatively impacted by a perception that the overall product is of inferior quality and construction.

The present invention is directed to a link to connect two rods of a door lock assembly in a vehicle door which compensates for rod length non-uniformities. The link has an elongate, generally cylindrical clip base with an opening at one end having a series of ribs in an inner peripheral surface of the opening for press-fittingly receiving a threaded end of a first rod. On an opposite end of the clip is a threaded opening and connected longitudinal recess for locking around the threaded end of a second rod by simply pushing the rod in a direction transverse to its axis into the opening. The pushing action causes the clip base to encircle and radially clamp the rod within the opening while the threads of the opening matingly engage with complementary threads of the rod to axially lock the rod within the opening. Upon securing the second rod to the clip, a sleeve, carried by a pair of shallow channels on the periphery of the clip, is telescopingly slid from a shipping position on the clip over the clip base positively radially locking the second rod in place and linking both rods.

An advantage of the rod link to be described is that the first rod connected to the link and the second threaded rod can be pulled taut before transversely snapping the second rod into the clip thereby compensating for any manufacturing irregularities in length of the rods. Accordingly, when assembled within the vehicle door, the rods and link behave as a single rod of proper length improving the smoothness of operation, quality and reliability of the door lock mechanism.

Another object and advantage of the rod link is that it is of simple and durable two-piece construction and requires no tools to assemble to the two door lock rods of the assembly.

Other objects, features and advantages of this invention are to provide a link which has a locking sleeve telescopingly slidably carried by a clip base for coupling an end of two rods together; can be preassembled for shipping and further assembly; is well suited for use in either blind or tight assembly conditions; facilitates adjustment of the total length of both rods and the link during assembly to compensate for dimensional tolerances in the length of either rod, both rods, the vehicle door, rod mounting locations of the vehicle door or cumulative tolerance error thereof and thereby provide the desired length of the rods and link when assembled; compensates for cumulative or single component tolerance error to produce a linked rod assembly which behaves as a single rod of proper length improving the smoothness of operation, quality and reliability of the assembly; in one embodiment, allows at least partial disassembly of the link to readjust the total length of the assembly to correct assembly error or to service components of the vehicle door; requires no tools to assemble the link and both rods together; and is lightweight, corrosion resistant, strong, durable, of simple design and economical manufacture, and is easy to assemble and install.

These and other objects, features and advantages of this invention will be apparent from the following detailed description, accompanying drawings and appended claims in which the invention is set forth together with sufficient details to enable persons skilled in the art to practice the invention all in connection with the best mode presently contemplated of the invention.

BRIEF DESCRIPTION OF THE DRAWINGS

DRAWINGS accompany the disclosure and the various views thereof may be briefly described as:

FIG. 1 is a perspective view of an exemplary assembly in which the door rod lock link is used.

FIG. 2 is an exploded perspective view of a rod link detailing a clip base, sleeve and a first rod to be assembled.

FIG. 3 is a perspective view of the assembly and a second rod to be assembled shown exploded.

FIG. 4 is a perspective view of the assembly.

DETAILED DESCRIPTION OF THE INVENTION AND THE MANNER AND PROCESS OF USING IT

Figure 5:
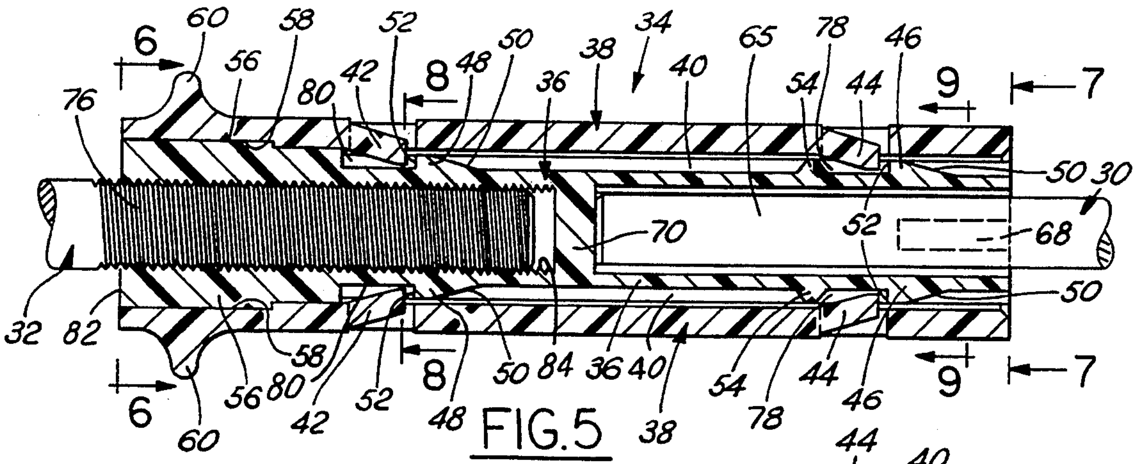
FIG. 5 is a sectional view of the assembly.
Figure 6:
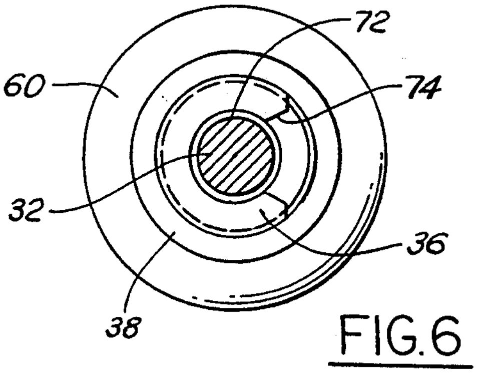
FIG. 6 is an end view of the assembly along line 6—6 of FIG. 5.
Figure 7:
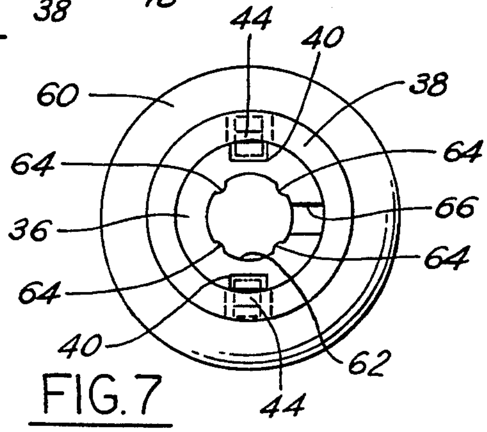
FIG. 7 is an end view on line 7—7 of FIG. 5.
Figure 8:
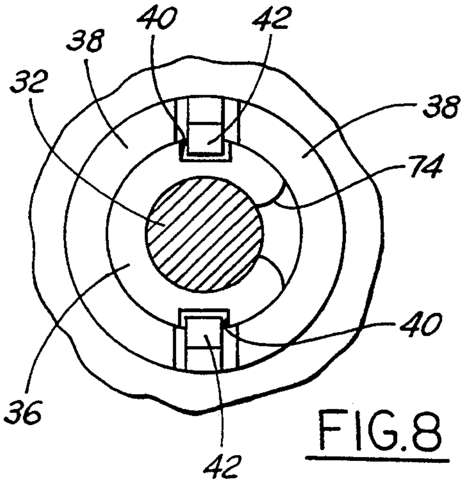
FIG. 8 is a partial sectional view of the assembly along line 8—8 of FIG. 5.
Figure 9:
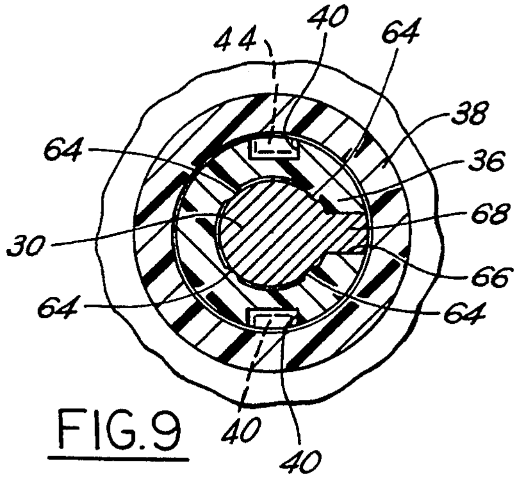
FIG. 9 is a partial sectional view on line 9—9 of FIG. 5.

With reference to the drawings, FIG. 1 illustrates a vehicle door 20 having a latch and lock assembly 22 connected to a slide mechanism 24 on an inner door panel 26 by a linked-rod assembly 28 within the door 20. The rod assembly 28 has a first rod 30 joined generally in line to a second rod 32 (shown in phantom) by a link 34 of this invention to transmit slide displacement to the latch 22 to lock or unlock the door 20 when latched to a structural pillar of a vehicle body (not shown). As depicted in FIG. 2, the link 34 has an elongate generally cylindrical clip base 36 and a hollow cylindrical locking sleeve 38 for receiving and joining one end of each rod while compensating for rod length manufacturing error producing a linked-rod assembly of proper length.

Both the clip 36 and sleeve 38 are preferably composed of nylon, vinyl, polyacetyl or another resilient plastic or elastomeric material. The clip 36 has two circumferentially spaced shallow longitudinal channels 40 in its outer peripheral surface to receive and guide a first set 42 and a second set 44 of resilient pawl projections in the inner peripheral surface of the sleeve 38. Each channel 40 has a first set 46 and a second set 48 of longitudinally spaced apart upraised detent blocks within the bed of the channel 40. As shown more clearly in FIG. 5, both sets of detents 46, 48 have an angled leading edge 50 to cammingly receive each flexible pawl of the sleeve 38 and a rear notched surface 52 that is generally perpendicular to the clip axis to positively prevent a received pawl from removal. Adjacent each detent of the first set 46 is a generally bevelled stop projection 54 within each channel 40 to temporarily obstruct the forward movement of each pawl of the first set 46 for shipping the link 34 as shown in FIG. 3. A generally cylindrical collar 56 at one end of the clip fits into a complementary recess 58 of the sleeve 38, as shown more clearly in FIG. 5, to prevent forward movement of the sleeve 38 with respect to the clip 36 when fully assembled. A flange 60 at one end of the sleeve is provided to ease assembly.

Referring additionally to FIG. 2, the clip shown has an opening 62 at one end for receiving a threaded end 65 of the first rod 30. Within the inner peripheral surface of the opening 62 are four generally circumferentially spaced axially-extending longitudinal ribs 64 for receiving and positively locking the rod 30 within the clip 36. As the rod 30 is press-fitted into the clip opening 62, each rib 64 compresses and expands around the threads 65 to prevent removal of the rod 30. A slot 66 is provided adjacent the opening 62 for receiving a dog-eared tab 68 on the rod 30 for preventing rotation and dislodgment of the rod 30 during use. The rod 30 may be inserted to a preset depth or until the tab 68 abuts against the end of the slot 66 or the end of the rod 30 bottoms against a wall 70 of the clip 36 as in FIG. 5.

As shown in FIG. 3, the opposite end of the clip 36 has an opening 72 of generally circular cross-section. A beveled longitudinal recess 74 in the outer peripheral surface of the clip 36 allows an end 76 of the second rod 32 to be inserted into the opening 72 by simply pushing the rod 32 in a direction transverse to its axis. The pushing action causes the clip base 36 to encircle and radially clamp the rod 32 within the opening 72. Preferably both the opening 72 of the clip 36 and the end 76 of the rod 32 are threaded or serrated to positively axially lock the rod 32 within the clip 36. The recess 74 and opening 72 in the clip 36 are of sufficient length to allow assembly of the rod 32 along the recess 74 to compensate for variations in rod length of either rod.

In assembly, the clip 36 is telescopingly inserted within the sleeve 38 until the first set of pawls 42 flexes and cams over the first set of detent blocks 46 until each pawl 42 rests within a first recess 78 between each stop 54 and first detent 46 temporarily locking the sleeve 38 over the clip 36 for shipping. To assemble the first rod 30 to the link 34, the threaded end 65 is fed through the sleeve 38 and press-fitted within the first clip opening 62 with the dog-eared tab 68 of the rod 30 interlocked in the slot 66 of the clip 36. Typically, the partially completed assembly is shipped to a final assembly plant where the second rod 32 is attached to the clip 36 within the vehicle door 20. During final assembly, the link 34 and first rod 30 and the second rod 32 are pulled generally taut to compensate for any manufacturing irregularities in rod length and the second rod 32 is snapped into the second opening 72 of the clip 36. To radially secure the second rod 32 within the clip 36, the flange 60 of the sleeve 38 is grasped and pulled completely over the clip 36 and recess 74 until the first set of pawls 42 is locked over the second set of detents 48 and received in a second set of recesses 80 of each channel 40 and the second set of pawls 44 is locked over the first set of detents 46 and received in the first set of recesses 78.

It will be apparent from the drawings that link 34 not only connects rods 30, 32 together, but also permits adjustment of the total length of the two rods and link 34 during assembly to compensate for manufacturing tolerance error in either rod or both rods, the rod mounting location in slide 24, the rod mounting location in lock assembly 22, the location of slide 24 and lock assembly 22, vehicle door 20 or cumulative tolerance error from any or all of the aforementioned variables. Clip 36 is telescopically received in sleeve 38 and first rod 30 is pressed in place during preassembly. Sleeve 38 is in the open position (FIG. 3) for shipping and permitting second rod 32 to be finally assembled in clip 36.

Typically, before assembling rod 32 to clip 36 during final assembly, ends of rods 30, 32 remote from link 34 are attached respectively to lock assembly 22 and slide 24. With the remote ends of rods 30, 32 fixed, the free ends to be connected are brought together at link 34 and rods 30, 32 are drawn as taut as required. The free end of rod 32 is then snapped into bore 72 through recess 74 with whatever degree of overlap of rod 32 with bore 72 which resulted from the prior assembly steps. Stated differently, rod 32 does not have to have any precise axial location in bore 72 in order to effectively lock rods 30, 32 together in the desired taut configuration. Sleeve 38 is then moved to the closed position (FIGS. 4–5) where sleeve 38 covers recess 74 to secure rod 32 in clip 36. Collar 56 prevents sleeve 38 from moving relative to clip 36 beyond the closed position during assembly or use. As such, the construction and operation of link 34 greatly facilitates final assembly where rods 30, 32 are joined together in a tight or even blind location. During final assembly, the assembly worker merely has to feel recess 72, snap rod 32 in place and close sleeve 38 over clip 36.

In the preferred embodiment, both openings 62, 72 are generally axially aligned for producing an axially aligned linked rod assembly 28, as shown in FIGS. 4 and 5, which effectively functions as a single rod when assembled without subjecting link 34 to bending moments during assembly and use. Although it is preferred to have a clip of coaxial construction, for use in other applications, clip 36 and sleeve 38 could be constructed so that both openings 62, 72 are not axially aligned.

In the first bore (opening 62), ribs 64 project radially inwardly from the inner surface of bore 62 to provide an interference fit between first rod 30 and clip 36 when rod 30 is pressed into bore 62. In the preferred embodiment illustrated, ribs 64 extend longitudinally substantially the length of bore 62 to provide engagement between rod 30 and clip 36 at any depth of insertion within bore 62. For some applications, ribs 64 may extend less than the length of bore 62 to ensure that rod 32 is inserted to a particular depth before interengaging the ribs 64. The distance which ribs 64 project radially inwardly may also be varied, such as for controlling the tightness of fit between rod 30 and clip 36. Although four ribs 64 are shown in FIG. 2, the number of ribs within bore 62 may also be varied. Other arrangements for securing rod 30 in clip 36 could also be used. Clip 36 might be constructed without ribs 64 and dimensioned to create an interference fit between rod 30 and the cylindrical inner wall of bore 62. The cylindrical inner wall of bore 62 could also be threaded. When rod 30 is inserted into the first bore (opening 62), tab 68 is preferably received in slot 66 of clip 36 to prevent rotation and/or limit depth of insertion of rod 30. Tab 68 may be omitted in applications where it is desirable to permit relative rotation between rod 30 and clip 36 during assembly to fine adjust the total length of assembly 28.

Recess 74 of clip 36 opens radially of the second bore (opening 72) to the exterior of clip base 36 to allow second rod 32 to overlap bore 72 so that rod 32 can be snapped into bore 72 along recess 74 to compensate for component tolerance variation or tolerance stack up and set the total length of linked rod assembly 28. In the preferred embodiment illustrated, recess 74 extends from adjacent wall 70 to the end of clip 36 to allow rod 32 to be inserted at any desired overlap along the entire length of bore 72. The width of recess 74 is preferably less than the diameter of rod 32 so that rod 32 snaps into clip 36 with an interference fit between rod 32 and clip 36 to prevent rod 32 from disengaging through recess 74. However, clip 36 could be constructed so that the width of recess 74 is substantially the same as or slightly greater than the diameter of rod 32 so that sleeve 38, when moved to the closed position, urges sidewall 82 of clip 36 surrounding rod 32 radially inwardly to clamp rod 32 within bore 72. To provide sufficient engagement between rod 32 and clip 36 when inserted into bore 72, the pitch and depth of threads 84 impressed in bore 72 may be selected to adequately matingly engage the threads 76 of rod 32 to retain rod 32 when inserted into clip 36.

Wall 70 not only separates both bores (openings 62, 72) but also limits the depth of axial insertion of each rod so that rod 30 is not inserted too far into clip 36 leaving sufficient room for the other rod 32 thus ensuring sufficient room within each bore to provide locking engagement between the clip 36 and the rod being inserted. When rods 30, 32 are received in bores 62, 72, wall 70 isolates the end of each rod from the other rod. Wall 70 may not be required in all applications.

As is apparent from FIGS. 2–5, sleeve 38, when in the open position (FIG. 3) for shipping, enables second rod 32 to be snapped into the second bore (opening 72) through recess 74. With sleeve 38 in the open position, readjustment of the total length of the assembly may be made, if necessary, by pulling rod 32 back through recess 74 free of clip 36 and reinserting rod 32 into opening 72 at the desired position along recess 74. When rod 32 has been properly installed in bore 72, sleeve 38 may be slid over clip 36 to the closed position (FIGS. 4 and 5) covering recess 74 thereby securing second rod 32 within opening 72. In the closed position, sleeve 38 also serves to stiffen clip 36 and secures the interference fit between each rod and clip 36. If desired, clip 36 and sleeve 38 could be constructed and arranged to have a slight interference fit when assembled in the closed position to urge sidewall 84 radially inwardly against rod 32 to more securely retain rod 32 in bore 72. However, the construction shown and described facilitates ease of assembling sleeve 38 over clip 36 while providing effective retention of rod 32 during use.

Clip 36 and sleeve 38, as shown in FIGS. 2–9, have a geometry and locking arrangement which securely locks the two components together when assembled to the closed position and resists removal under normal operating stress and may not be required in all applications. With clip 36 received in the closed position within sleeve 38, because stop surfaces 52 are steep, substantially radial as shown in FIG. 5, the interlock between pawls 42, 44 and detent blocks 48, 46 respectively provides positive locking engagement to prevent even partial disassembly without the application of excessive force and/or damaging link 34. Although the pawl and detent locking arrangement disclosed is preferred for ease of manufacture, assembly and use, other locking arrangements could be used to secure sleeve 38 to clip 36.

It has been found desirable and even preferred for enhanced versatility to provide a modified link 90 (FIG. 10–12) which can be partially disassembled without excessive manual force and without damaging the link. Link 90 enables readjustment of the total length of the linked rod assembly even after final assembly. This may be particularly advantageous in tight or blind assembly conditions, such as within vehicle door 20. Link 90 also allows subsequent disassembly for servicing or replacing any component of the assembly.

Figure 12:
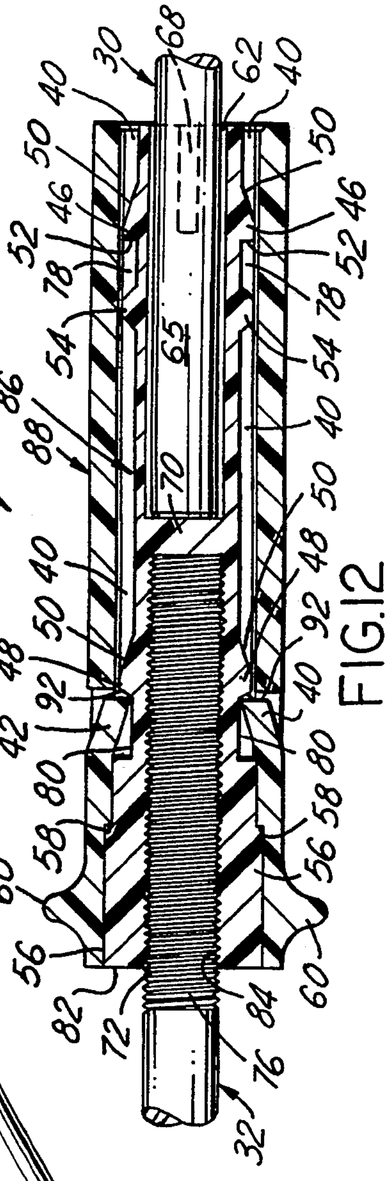
FIG. 12 is a sectional view of the second link showing the sleeve in a closed position on the clip.
Figure 10:
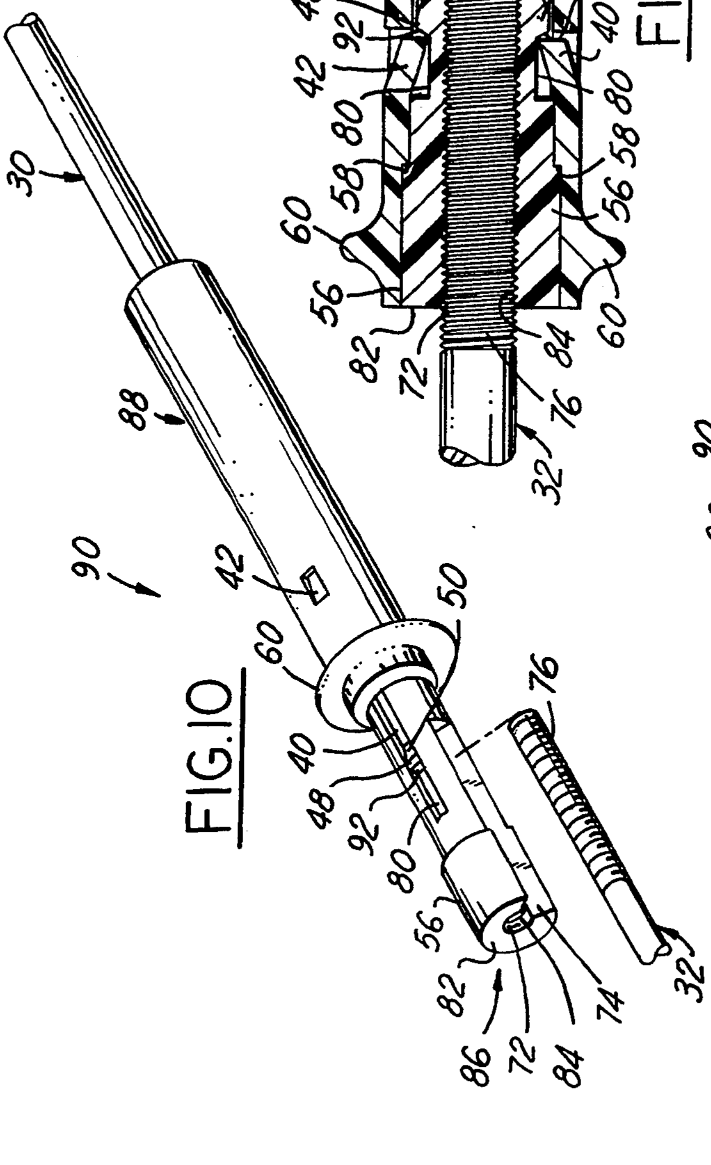
FIG. 10 is a perspective view of a second link embodiment with the sleeve shown in an open position on the clip.
Figure 11:
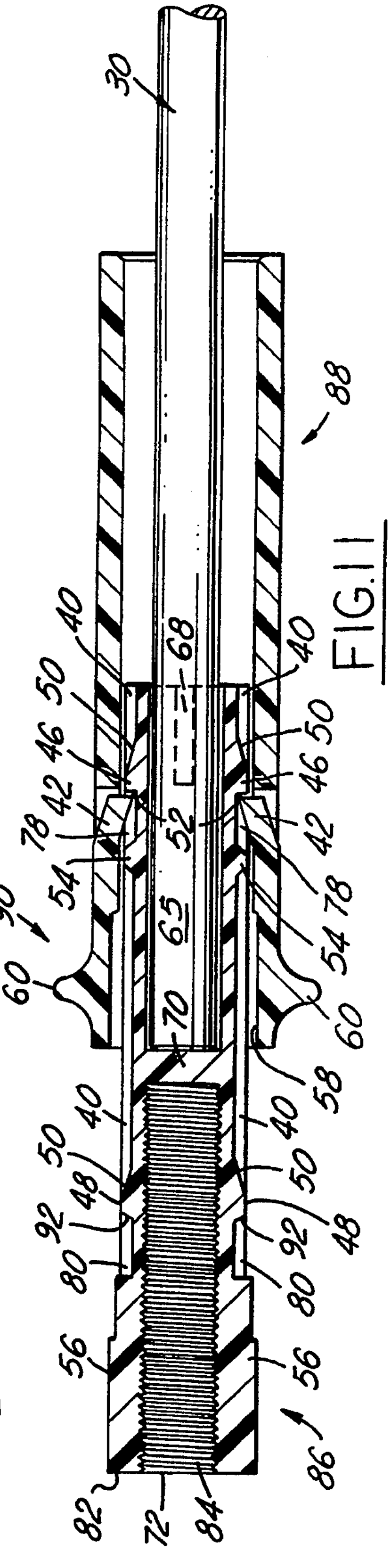
FIG. 11 is a sectional view of the second link with the sleeve in the open position.

Referring in greater detail to link 90 as shown in FIGS. 10–12, like reference numerals are used for like parts corresponding to those in FIGS. 2–9. Sleeve 88 is releasably retained on clip 86 when in the closed position permitting sleeve 88 to be moved between the open and closed positions for readjusting the length of assembly 88 or for disassembling link 90 to service components within vehicle door 20. Sleeve 88 essentially differs from sleeve 38 only in having a single set of pawl projections 42. Clip 86 is essentially the same as clip 36 except that a stop surface 92 of each second detent block 48 is slightly ramped for releasably engaging each first pawl 42 of sleeve 88 when in the closed position. As illustrated, stop surfaces 92 are steeper than ramp surfaces 50 to provide locking engagement, but not as steep as surfaces 52 (FIG. 5) so that the locking engagement is releasable. To release sleeve 88 from the closed position, axial force may be applied to sleeve 88 causing pawl 42 to cammingly ride up stop surface 92 over detent 48 thereby disengaging pawl 42 from detent 48. In other respects, clip 86 and sleeve 88 (FIGS. 10–12) have essentially the same construction and operation as clip 36 and sleeve 38 (FIG. 1–9). This selection of stop surface angles on the second set of detent blocks 48, together with using only a single set of pawls 42 (FIGS. 10–12), as contrasted to the use of two sets of pawls 42, 44 to both engage respectively positive locking detents 48, 46 (FIGS. 2–9), achieves releasable engagement between sleeve 88 and clip 86 of modified link 90 when in the closed position. As a result, with the modified link 90 of FIGS. 10–12, sleeve 88 can be manually moved back and forth between the closed and open positions without damaging link 90. The initial assembly and use of the modified link 90 is otherwise essentially the same as link 34 (FIGS. 1–9).

If partial disassembly or readjustment of the total length of linked rod assembly 28 is required after initial assembly with the modified link 90, sleeve 88 may be returned to the open position and rod 32 may be removed from clip 86. To reassemble the components, rod 32 is snapped through recess 74 and into opening 72 with the desired overlap before sleeve 88 is slid to the closed position securing rod 32 to clip 36. The single set of pawls 52 and slightly ramped stop surfaces 92 have been found to provide sufficient locking engagement between sleeve 88 and clip 86 so that link 90 does not inadvertently come apart in use.

Preferably, both clips 36, 86 and sleeves 38, 88 are each of one piece, unitary construction for simpleness and ease of manufacture, as by injection molding from a generally homogenous material such as nylon, polyacetyl or another plastic material. A clip 36, 86 constructed of either of these materials is strong and yet slightly resiliently deformable to provide a secure, snap-in, interference fit between rod 32 and either clip 36, 38 and enable pawls 42, 44 to lockingly engage detent blocks 46, 48 to resist disengagement. Sleeves 38, 88 constructed of either of these materials are stiff enough to support the clip when fully assembled.

While the present invention has been disclosed in connection with the preferred embodiments thereof, it should be understood that there may be other embodiments which fall within the spirit and scope of the invention and that the invention is susceptible to modification, variation and change without departing from the proper scope or fair meaning of the following claims.

What is claimed is:

1. A door rod lock link for receiving, joining and positively linking two ends of two rods comprising:
(a) an elongate clip base having a first opening and means in an inner peripheral surface of said opening for receiving and positively interlocking one end of a rod;
(b) a recessed longitudinal channel in an opposite end of said base for transversely receiving one end of a second rod into said base;
(c) one or more axially extending channels in an outer peripheral surface of said base and spaced detent projections along said channels to interengage and interlock with a plurality of hook projections of a sleeve; and
(d) an elongate hollow sleeve having a plurality of spaced hook projections for interengaging and interlocking with said detent projections of said channels of said clip base for positively locking said sleeve over said base and for radially locking said second rod within said recessed channel.

2. The door rod lock link of claim 1 wherein said recessed channel has a plurality of threads in an inner peripheral surface of said channel for interengaging and interlocking with a complementary threaded end of a rod to positively axially lock the rod within said clip base.

3. The door rod lock link of claim 1 wherein said rod receiving and interlocking means comprises one or more axially extending ribs in an inner peripheral surface of said opening for receiving and interlocking one end of a threaded rod.

4. The door rod lock link of claim 1 wherein said clip base has a slot in said base adjacent said first opening for generally locating a tab on a rod received within said first opening to prevent rotation and dislocation of the rod from said clip base.

5. The door rod lock link of claim 1 wherein said detent projections on said outer peripheral channels of said clip base have angled camming surfaces to ease the interlocking of said hook projections of said sleeve with said detent projections of said channels.

6. The door rod lock link of claim 1 wherein said sleeve can be slidably received over said clip in an open position for shipping said clip and said sleeve together as an assembly while enabling said second rod to be inserted into said recessed channel and movable to a second closed position where said sleeve covers said recessed channel for retaining said second rod within said channel of said clip when said second rod has been received within said channel.

7. A door rod lock link for joining two rods comprising:
(a) an elongate generally cylindrical clip base having a first opening for axially receiving one end of a first rod therein;
(b) means for interlocking an inner peripheral surface of said opening and said first rod to retain said rod in said first opening;
(c) a recessed longitudinal channel in an opposite end of said clip base for transversely receiving and retaining one end of a second rod therein;
(d) at least one axially extending channel in an outer peripheral surface of said clip base and at least one spaced detent projection in said channel; and
(e) an elongate generally cylindrical hollow sleeve having at least one pawl projection for engaging with said detent projection when said sleeve has been received over said clip base for retaining said sleeve on said clip base and securing said second rod within said recessed channel.

8. The door rod lock link of claim 7 wherein said recessed longitudinal channel has a plurality of threads in an inner peripheral surface of said recessed channel for interengaging and interlocking with a complementary threaded end of a rod to positively axially lock said rod within said clip base.

9. The door rod lock link of claim 7 wherein said rod receiving and interlocking means comprises at least one axially extending rib in an inner peripheral surface of said opening for receiving and interlocking one end of a threaded rod.

10. The door rod lock link of claim 7 wherein said clip base has a slot in said base adjacent said first opening for generally locating a tab on a rod received within said first opening to prevent rotation and dislocation of said rod from said clip base.

11. The door rod lock link of claim 7 wherein said detent projection in said channel of said clip base has an angled camming surface to ease the interlocking of said hook projection of said sleeve with said detent projection of said channels.

12. The door rod lock link of claim 7 wherein said sleeve can be slidably received over said clip in an open position for shipping said clip and said sleeve together as an assembly while enabling said second rod to be inserted into said recessed channel and movable to a second closed position where said sleeve covers said recessed channel for retaining said second rod within said channel of said clip when said second rod has been received within said channel.

13. A door rod lock link for joining two rods comprising:
(a) a clip;
(b) a first opening in said clip for receiving and retaining a first rod therein;
(c) a second opening in said clip for receiving and retaining a second rod therein;

(d) a channel means in said clip in communication with said second opening for enabling said second rod to be inserted transversely into said second opening through said channel means at varying overlap of said second rod with said second opening to thereby select varying combined total lengths of said first rod, said clip and said second rod during assembly; and (e) a sleeve slidably received on said clip in a first open position for shipping said sleeve and said clip together as an assembly and for permitting assembly of said second rod to said clip and movable to a second closed position covering said channel means of said clip for retaining said second rod within said second opening.

14. The door rod lock link of claim 13 also comprising:

(a) at least one pawl carried by said sleeve;

(b) at least one complementary channel in said clip for slidably receiving said pawl of said sleeve to enable said sleeve to move relative to said clip in either direction along said clip;

(c) a first detent means carried by said clip for engaging with said pawl when said sleeve is received on said clip in said open position for retaining said sleeve in said open position and permitting said sleeve to move from said open position to said closed position; and (d) a second detent means for engaging with said pawl when said sleeve is on said clip in said closed position for retaining said sleeve in said closed position.

15. The door rod lock link of claim 13 wherein each detent means comprises a ramp to facilitate entry of said at least one pawl into engagement with said detent means when said clip is telescopically assembled in said sleeve.

16. The door rod lock link of claim 13 also comprising:

(a) at least one pawl carried by said sleeve;

(b) at least one complementary channel in said clip for slidably receiving said pawl to permit telescopic movement of said sleeve relative to said clip in either direction along said clip;

(c) at least one first detent means in said channel for engaging with said pawl when said sleeve is received on said clip in said open position for releasably retaining said sleeve in said open position; and (d) at least one second detent means in said channel and spaced axially from said first detent means for engaging with said pawl when said sleeve is moved to said closed position for releasably retaining said sleeve in said closed position.

17. The door rod lock link of claim 15 also comprising:

(a) a pair of pawls carried by said sleeve and circumferentially spaced opposite from each other;

(b) a pair of circumferentially spaced complementary channels in said clip with each channel being arranged to slidably receive a respective pawl while permitting movement of said sleeve relative to said clip in either direction along said clip;

(c) a first detent means in each of said channels for engaging with a respective pawl when said sleeve is received on said clip in an open position and releasably retaining said sleeve in said open position; and (d) a second detent means spaced axially from said first detent means in each of said channels for engaging with a respective pawl when said sleeve is received on said clip in said closed position to retain said sleeve in said closed position.

18. A link for connecting a first rod to a second rod comprising a clip member for receiving and retaining one end of said first rod and one end of said second rod and a hollow sleeve member for telescopically receiving said clip member therein to further secure said rod ends together when said clip and said sleeve members are telescopically assembled together to a closed position, said clip member having a first bore to receive and retain said one end of said first rod and a second bore to receive and retain said one end of said second rod, slot means in said clip member extending axially of said second bore and opening radially of said second bore for receiving one end of said second rod into said second bore in a direction radially of said second bore and transversely to an axis of said second rod so that when said clip member is telescopically assembled within said sleeve to said closed position, said sleeve member covers said slot means to prevent removal of said one end of said second rod from said second bore through said slot means, and wherein said first and second bores are axially aligned with each other and open in opposite directions to link said rod ends in axial alignment with each other.

19. The link set forth in claim 18 further comprising first means releasably interengaging said clip member with said sleeve member when said clip member is partially telescopically assembled with said sleeve member in said open position and further comprising second means interengaging said clip member with said sleeve member in said closed position.

20. The link set forth in claim 19 wherein said first interengaging means includes pawl-like means on one of said members and first detent means on the other of said members arranged and disposed relative to each other to restrain disassembly of said clip and said sleeve members when said sleeve member is in said open position and wherein said second interengaging means comprises said pawl-like means and a second detent means spaced axially of said bores from said first detent means.

21. The link set forth in claim 20 wherein said first and second detent means each have a locking face at a trailing side thereof when said sleeve member and said clip member are telescoped together and said detent means each have respective ramp faces at an opposite side thereof so that said ramp faces facilitate telescoping assembly of said link and said locking faces restrain telescopic withdrawal of said clip member from said sleeve member.

22. The link set forth in claim 21 wherein said locking face on said first detent means is substantially radial to said axis to provide positive locking engagement with said pawl-like means and said ramp faces on said first and said second detent means are inclined at an angle substantially less than 90°.

23. The link set forth in claim 22 wherein said locking face on said second detent means is inclined at an angle greater than said ramp faces and less than said locking face on said first detent means to provide releasably locking engagement.

24. The link set forth in claim 23 wherein said locking face on said second detent means is substantially radial of said axis to provide positive locking engagement.

25. The link set forth in claim 18 further comprising means providing interference fit between said first rod and said first bore and between said second rod and said second bore to restrain axially withdrawing said rods from said bores.

26. The link set forth in claim 18 wherein at least one of said interference fits is a threaded interference fit.

* * * * *